United States Patent [19]

Gellert

[11] Patent Number: 4,911,636
[45] Date of Patent: * Mar. 27, 1990

[54] INJECTION MOLDING NOZZLE HAVING NOSE PORTION WITH HEATING ELEMENT ENCIRCLING THE BORE

[76] Inventor: Jobst U. Gellert, 7A Prince Street, Georgetown, Ontario, Canada, L7G 2X1

[ * ] Notice: The portion of the term of this patent subsequent to Sep. 6, 2005 has been disclaimed.

[21] Appl. No.: 260,920

[22] Filed: Oct. 21, 1988

[30] Foreign Application Priority Data

Sep. 30, 1988 [CA] Canada .................................. 578973

[51] Int. Cl.$^4$ .............................................. B29C 45/23
[52] U.S. Cl. .................................. 425/549; 264/328.8; 264/328.15; 264/328.16; 425/552; 425/562; 425/570
[58] Field of Search ............... 425/549, 562, 570, 572, 425/564, 588, 552; 264/328.8, 328.14, 328.15, 328.16

[56] References Cited

U.S. PATENT DOCUMENTS

| | | |
|---|---|---|
| 4,266,723 | 12/1981 | Osuna-Diaz ......................... 425/549 |
| 4,279,588 | 7/1981 | Gellert ................................. 425/549 |
| 4,450,999 | 5/1984 | Gellert ................................. 425/549 |
| 4,622,001 | 11/1986 | Bright et al. ......................... 425/549 |
| 4,652,230 | 3/1987 | Osuna-Diaz ......................... 425/570 |
| 4,688,622 | 8/1987 | Gellert ................................. 164/61 |
| 4,768,283 | 9/1988 | Fellert ................................. 425/549 |
| 4,768,945 | 9/1988 | Schmidt et al. ..................... 425/549 |
| 4,787,836 | 11/1988 | Osuna-Diaz et al. ............... 425/549 |

Primary Examiner—Jay H. Woo
Assistant Examiner—Timothy W. Heitbrink
Attorney, Agent, or Firm—Riches, McKenzie & Herbert

[57] ABSTRACT

An integral sprue gated injection molding nozzle having a melt bore extending centrally therethrough wherein a circular forward end portion of the electrical heating element encircles the melt bore in the nose portion to provide additional heat adjacent the gate.

1 Claim, 5 Drawing Sheets

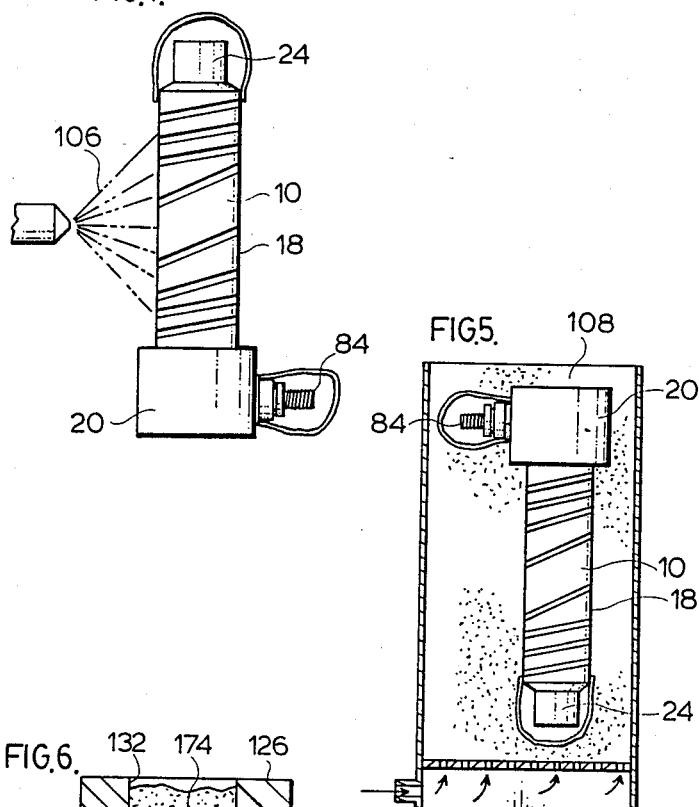
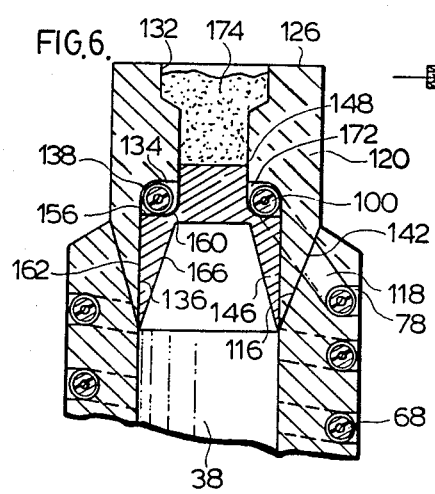
FIG.4.
FIG.5.
FIG.6.

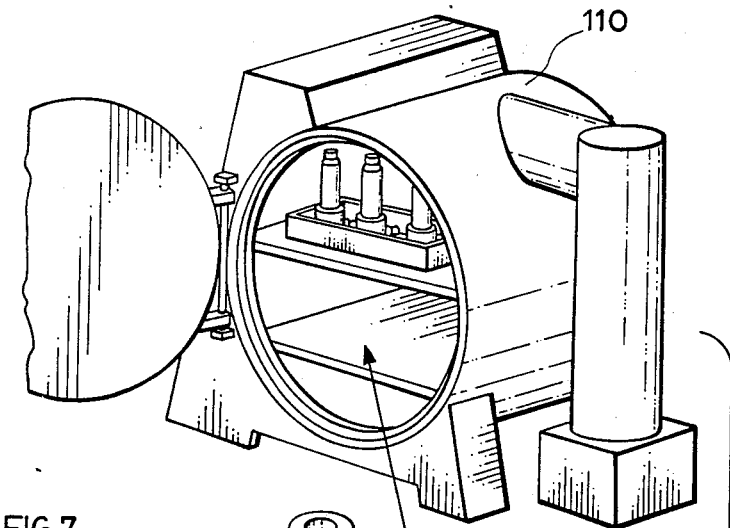
FIG.7.
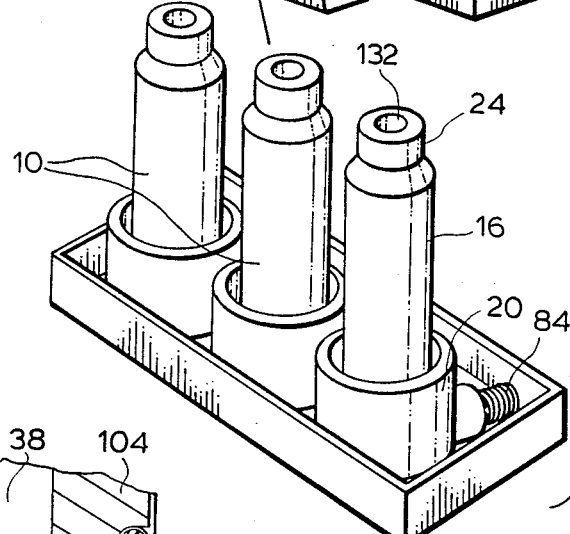
FIG.8.
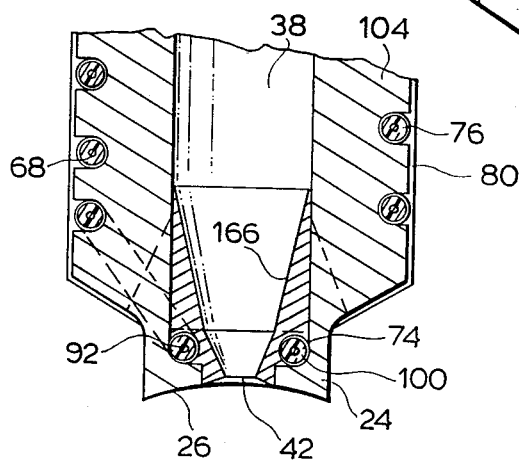

INJECTION MOLDING NOZZLE HAVING NOSE PORTION WITH HEATING ELEMENT ENCIRCLING THE BORE

BACKGROUND OF THE INVENTION

This invention relates to a sprue gated injection molding nozzle and a method of making it having an integral electrical heating element, a forward end portion of which is integrally brazed in the nose of the nozzle to substantially encircle the melt bore which extends centrally therethrough.

Injection molding nozzles having integral electrical heating elements and methods of making them are well known in the art. For example, U.S. Pat. No. 4,768,945 to Schmidt which issued Sept. 6, 1988 and Canadian patent application Ser. No. 549,517 to Gellert filed Oct. 16, 1987 entitled "Method of Manufacture of Injection Molding Nozzle Having Grounded Heating Element Brazed into Pointed Tip" describe a nozzle and method of making it in which the integral heating element extends centrally into the pointed nose portion. The applicant's U.S. Pat. No. 4,768,283 which issued Sept. 6, 1988 discloses an earlier nozzle in which the forward end of the integral electrical heating element extends into the pointed nose portion. A further improvement on this type of nozzle having a pointed tip is shown in the applicant's Canadian patent application Ser. No. 563,981 filed Apr. 13, 1988 entitled "Injection Molding Nozzle Having Multiple Thickness Heating Element and Method of Manufacture".

With the continual developement of more and more difficult to mold materials it is also well known to provide more heat closer to the gate area. For instance nozzles having a variety of heat conductive torpedoes are shown in the applicant's U.S. Pat. Nos. 4,279,588 which issued July 21, 1981 and 4,450,999 which issued May 29, 1984. Other examples are shown in U.S. Pat. No. 4,266,723 to Osuna-Diaz which issued May 12, 1981 and Mold-Masters Canadian patent application Ser. No. 529,897 filed Feb. 17, 1987 entitled "Injection Molding System Having Manifold with Side Mounted Nozzles and Method and Ser. No. 578,974 filed Sept. 30, 1988 entitled "Injection Molding Nozzle with Replaceable Gate Insert". Another development to respond to this problem is to provide a heated gate insert as shown in the applicant's Canadian patent application Ser. No. 559,000 filed Feb. 16, 1988 entitled "Injection Molding Heated Gate Insert and Method". While all of these previous nozzles represent considerable improvements, for certain applications and types of material it is still desirable to provide a nozzle having a central melt bore with additional heat in the gate area. Additional heat close to the gate is also very desirable when temperature assisted or thermal gating is being used as described in U.S. Pat. No. 4,768,945 referred to above.

SUMMARY OF THE INVENTION

Accordingly it is an object of the present invention to at least partially overcome the disadvantages of the prior art by providing a nozzle and method of making it having an integral electrical heating element with a forward end portion which is integrally brazed in the nose of the nozzle to substantially encircle the melt bore which extends centrally therethrough.

To this end, in one of its aspects, the invention provides a sprue gated injection molding nozzle having a forward end, a rear end and a central portion with a generally cylindrical outer surface extending between a collar portion adjacent the rear end and a nose portion adjacent the forward end, the nozzle having a central melt bore which extends from an inlet at the rear end to a gate at the forward end, the nozzle having an electrically insulated heating element with a rear end, a forward end and a central portion integrally brazed in a spiral channel in the cylindrical outer surface of the central portion of the nozzle, the rear end of the heating element extends out through the collar portion to an electrical terminal, the improvement wherein, the electrical heating element has a circular forward end portion adjacent the forward end which is integrally brazed in the nose portion of the nozzle to substantially encircle the central melt bore extending therethrough.

In another of its aspects, the invention provides a method of making an integral elongated heated injection molding nozzle with a forward end, a rear end, and a melt bore extending centrally therethrough from an inlet at the rear end to a gate at the forward end, the nozzle having a central portion with a generally cylindrical outer surface extending from a steel collar portion adjacent the rear end to a nose portion adjacent the forward end, and an electrically insulated heating element with a forward end and a rear end including forming a steel main body portion with a forward end, a rear end and a melt bore extending centrally therethrough, forming the steel collar portion and mounting it on the rear end of the main body portion after winding a portion of the heating element in a spiral channel extending around the cylindrical outer surface of the main body portion with the rear end of the heating element extending outwardly from the collar portion to an electrical terminal, applying brazing material to at least the cylindrical outer surface of the main body portion, and heating the assembly in a vacuum furnace for a period of time and to a temperature sufficient to integrally braze the nozzle together, the improvement including, providing the forward end of the main body portion with a tapered opening which is in alignment with the melt bore and a diagonal heating element bore, the opening having an inner surface which extends outwardly forward to the forward end of the body portion, the heating element bore extending diagonally from the inner surface to join the spiral channel in the cylindrical outer surface of the main body portion, forming a steel funnel member having a central bore extending therethrough from a rear end to a forward end, the bore having a larger diameter portion with an inner surface extending from the rear end to join a smaller diameter portion extending from a mouth at the forward end at a radially extending shoulder, the funnel member having a rear portion with an outer surface which tapers outwardly forward from the rear end of the funnel member to match the tapered inner surface of the opening at the forward end of the main body portion, the rear portion having a heating element slot extending diagonally therethrough, forming a steel hub member with a rear end and a forward end having a smaller diameter head portion which extends centrally from a larger diameter rear portion at a radially extending shoulder, the head portion fitting in the smaller diameter portion of the central bore of the funnel member, the rear portion having an outer surface which fits inside the inner surface of the larger diameter portion of the bore through the funnel member, the rear portion having a central opening therein with an inner surface which tapers inwardly forward from a mouth at the rear end which is substantially equal in diameter to the melt bore through the main body portion, the rear portion having a heating element slot extending diagonally therethrough, winding a forward end portion of the heating element to extend around the head portion of the hub member, press fitting the hub member into the funnel member to a position wherein the head portion of the hub member is received in the smaller diameter portion of the bore through the funnel member and the rear portion of the hub member is received in the larger diameter portion of the bore through the funnel member, the forward end portion of the heating element encircles the head portion of the hub member in a circumferential space between the radially extending shoulders of the hub member and the funnel member, and the diagonally extending heating element slots of the hub member and the funnel member are aligned to receive the heating element therethrough, and tack welding the hub member and the funnel member together in this position, inserting the rear end of the heating element through the diagonal heating element bore in the forward end of the main body portion, seating the assembled hub member and funnel member in the tapered opening in the forward end of the main body portion in a position wherein the tapered outer surface of the funnel member abuts against the matching tapered inner surface of the opening, and the slots of the hub member and the funnel member are aligned with the diagonal heating element bore in the forward end of the main body portion, and tack welding them together in this position, loading a predetermined amount of brazing material into the upright mouth of the smaller diameter portion of the bore of the funnel member after winding the portion of the heating in the spiral channel extending around the cylindrical outer surface of the main body portion with the rear end of the heating element extending outwardly from the collar portion to an electrical terminal and applying the brazing material to the cylindrical outer surface of the main body portion, whereby when the assembly is heated in the vacuum furnace the hub member, funnel member and forward end portion of the heating element are also integrally brazed in place, and machining through the head portion of the hub member and machining the funnel member to provide the nozzle with a nose portion of a desired configuration having a gate extending therethrough from the melt bore which is substantially encircled by the integral forward end portion of the heating element.

Further objects and advantages of the invention will appear from the following description taken together with the accompanying drawings.

BRIEF DESCRIPTION OF THE DRAWINGS

FIGS. 2-8 illustrate a sequence of the steps involved in making the nozzle according to one embodiment of the invention.

DETAILED DESCRIPTION OF THE DRAWINGS

Figure 1:
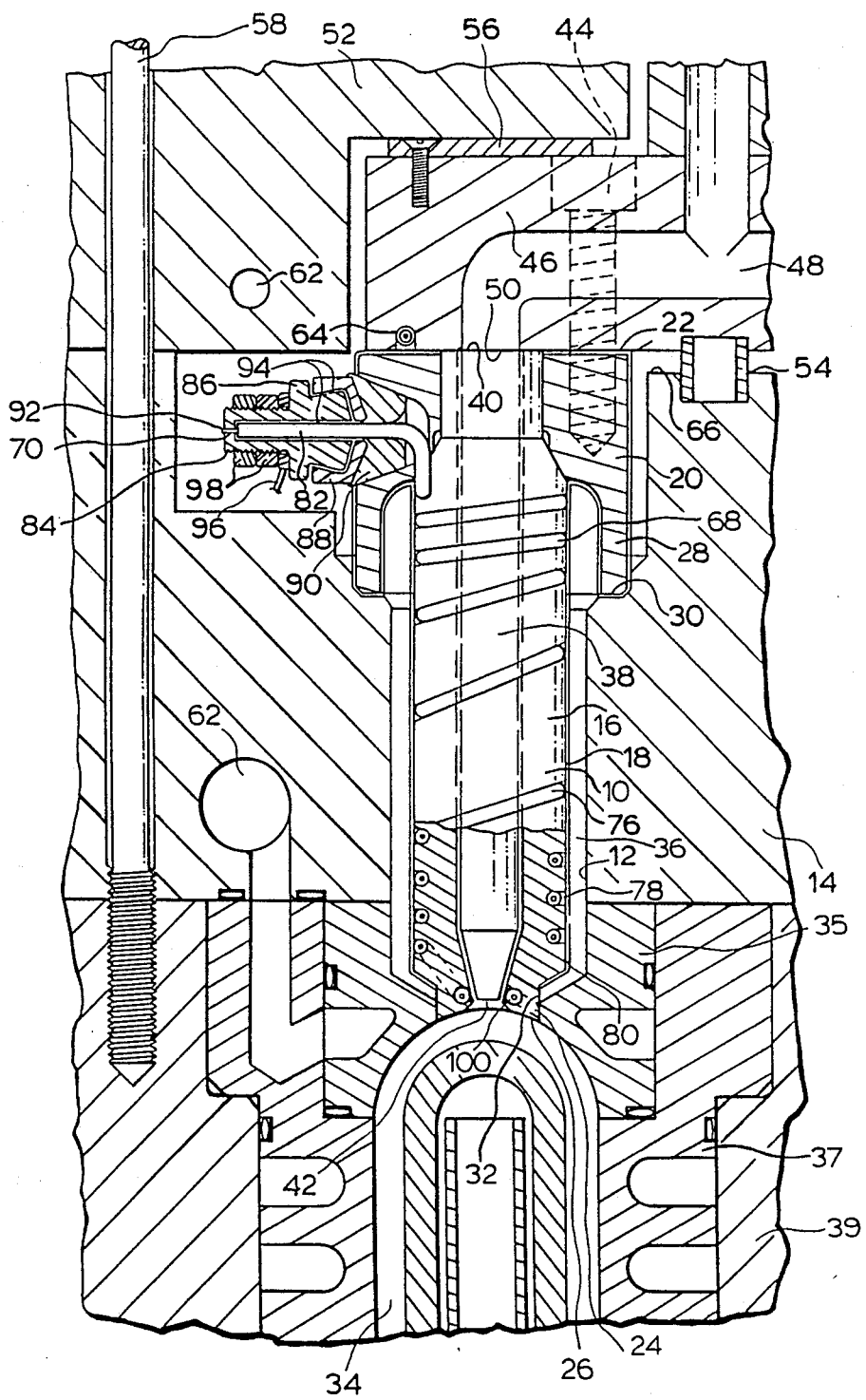
FIG. 1 is a sectional view of a portion of a typical injection molding system having a nozzle according to a preferred embodiment of the system.
Figure 2:
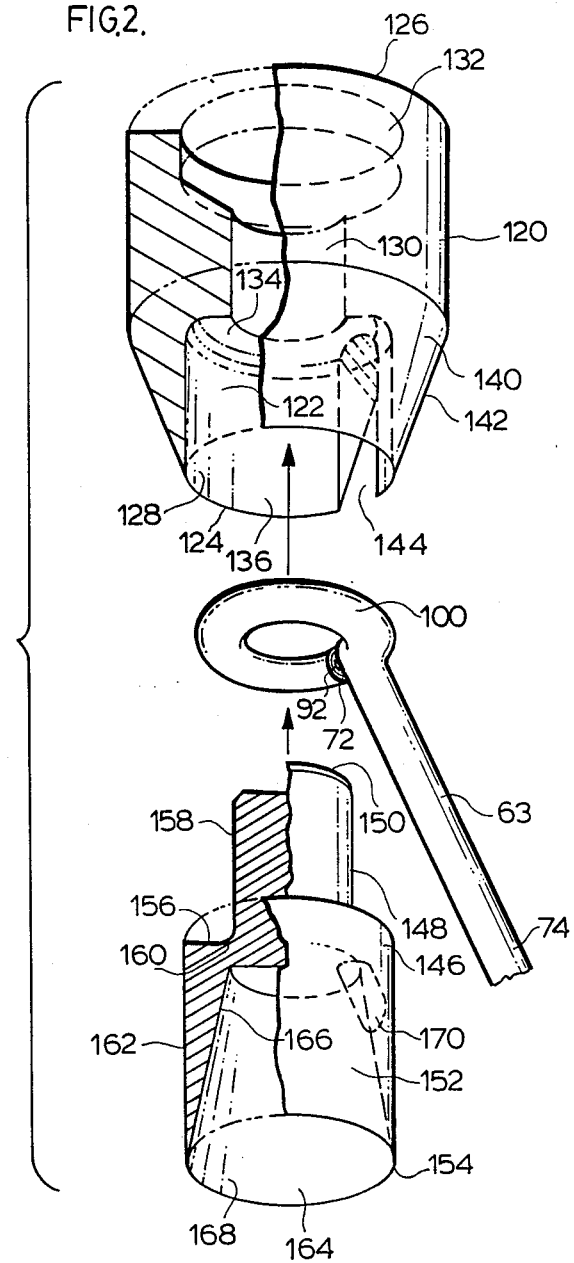

Reference is first made to FIGS. 1 and 2 which illustrates a portion of an injection molding system in which a number of nozzles 10 according to the invention are seated in wells 12 in the cavity support plate 14. Each nozzle 10 has a central portion 16 with a cylindrical outer surface 18 extending between a collar portion 20 adjacent the rear end 22 and a nose portion 24 adjacent the forward end 26. A circumferential insulating flange 28 which extends from the collar portion 20 sits on a circumferential shoulder 30 and the nose portion 24 is received in an opening 32 through a gate insert 35 leading to a cavity 34. Thus, the nozzle 10 is accurately located in this position in which the cylindrical outer surface 18 of the central portion 16 is separated from the surrounding cavity support plate 14 and gate insert 35 by an insulative air space 36. In the mold shown for making preforms for stretch-blow bottles the gate insert 35 is seated in a cavity insert 37 in a cavity retainer plate 39 with suitable cooling provided. The nozzle 10 has a central melt bore 38 which runs from an inlet 40 at the rear end 22 of the nozzle 10 to a gate 42 extending through the nose portion 24 to the cavity 34 as described in more detail below.

The nozzles 10 are secured by bolts 44 to a common elongated manifold 46 which has a melt passage 48 which branches to a number of outlets 50, each of which is aligned with the melt bore 38 through one of the nozzles 10. The manifold 46 is located securely in place between a back plate 52 and the cavity support plate 14 by a central locating ring 54 and a titanium pressure pad 56. The back plate 52 is held in place by bolts 58 which extend through the cavity support plate 14 into the cavity retainer plate 39. The back plate 52 and the cavity plate 14 are cooled by pumping cooling water through cooling conduits 62. The manifold 46 is heated by an electric heating element 64 which is cast into it as described in the applicant's U.S. Pat. No. 4,688,622 entitled "Injection Molding Manifold Member and Method of Manufacture" which issued Aug. 25, 1987. The locating ring 54 bridges another insulative air space 66 between the heated manifold 46 and the cavity support plate 14.

The nozzle 10 is heated by an electrically insulated heating element 68 which has a rear end 70 and a forward end 72. The heating element 68 has a chrome nickel resistance wire 92 extending centrally through a refractory powder electrical insulating material such as magnesium oxide inside a steel casing 74. The heating element 68 has a portion 76 which is integrally brazed in a spiral channel 78 in the outer surface 18 of the central portion 16 of the nozzle 10. The portion 76 of the heating element 68 in the channel 78 is covered by a protective nickel coating 80 which is applied as described in the applicant's U.S. Pat. No. 4,768,283 which issued Sept. 6, 1988. The heating element 68 has a rear end portion 82 which extends outwardly from the collar portion 20 to an electrical terminal 84 which is made by a method described in detail in the applicant's patent application Ser. No. 578,975 filed Sept. 30, 1988 entitled "Method of Manufacture of an Electrical Terminal on n Injection Molding Nozzle". The rear end portion 82 extends through a terminal body 86 with a protective cap 88 which is fixed to a steel plug 90. The heating element 68 is stripped adjacent the rear end to expose the resistance wire 92 which is electrically connected to the terminal body 86. However the terminal body is electrically insulated from the heating element casing 74 and the protective cap 88 by a thin coating 94 of insulating material such as magnesium oxide. Thus, the terminal body 86 is structurally secured to withstand torque as an external lead 96 is connected to it or disconnected from it by nuts 98.

The heating element 68 also has a circular forward end portion 100 which is integrally brazed in the nose portion 24 of the nozzle 10 to substantially encircle the central melt bore 38 adjacent the gate 42. In this embodiment, the casing 74 and insulating material are also stripped to expose the resistance wire 92 adjacent the forward end 72 of the low voltage single wire heating element 68. Thus, when the forward end portion 100 is integrally brazed in place as described in more detail below, the forward end 72 of the heating element 68 is grounded to complete the circuit.

In use, the system is assembled as shown in FIG. 1 and electrical power is applied through the lead 96 to the terminal 84 of the heating element 68 of each nozzle 10 and to the heating element 64 in he manifold 46 to heat the nozzles 10 and the manifold 46 to a predetermined operating temperature. Pressurized melt from a molding machine (not shown) is injected into the melt passage 48 through the manifold 46 according to a predetermined cycle in a conventional manner. The presurized melt flows through the melt bore 38 in each nozzle, through the gates 42 and fills the cavities 34. After the cavities 34 are filled, injection pressure is held momentarily to pack and then released. After a short cooling period, the mold is opened to eject the molded preforms. After ejection the mold is closed and injection pressure is reapplied to refill the cavities 34. This cycle is repeated continuously with a frequency dependent on the size and shape of the cavities and the type of material being molded.

In an alternate use of the system when a larger diameter gate is desired and/or an easily stringing crystalline material is being molded, temperature assisted or thermal gating can be employed. This involves controlling power to the leads 96 to the heating elements 68 so that o heat is provided to the nozzles for a short period of time before and when the mold is opened. Contact between the nose portion 24 and the surrounding cooled gate insert 35 results in a rapid temperature drop in the gate area. For most crystaline materials, a temperature drop of 20°-25° C. is sufficient to freeze the gate prior to ejection. Shortly after the mold is opened, electrical power is reapplied to start heating the melt in the gate area to reopen the gate when injection pressure is reapplied after the mold is closed following ejection. While heat is also lost from the central portion 16 of the nozzle while the power is off, the air gap insulated steel mass surrounding the melt bore 38 retains sufficient heat so that no solidification occurs in this area. It will be apparent that the shape and size of the nozzle and the periods of the molding cycle are critical to the success of thermal gating using only a single heating element 68. However, having the forward end portion 100 of the heating element located very close to the melt bore 38 in the nose portion 24 allows the gate temperature to be raised and lowered relatively quickly and considerably improves performance.

Nozzles of this general type have previously been made by the method described in detail in the applicant's U.S. Pat. No. 4,768,283 referred to above. The nozzle is made by integrally brazing the collar portion 20 and the components of the electrical terminal 84 to a steel main body portion 104. They are assembled by tack welding them in place with the portion 76 of the heating element 68 wound in the spiral channel 78 in the outer surface 18 of the main body portion 104. Nickel brazing paste is applied to the joints and the assembly is sprayed with a binder 106 such as acrylic lacquer and then dipped in agitate metallic powder 108 such as nickel or an alloy thereof to coat the surfaces as illustrated in FIGS. 4 and 5. As seen in FIG. 7, the assembly is then heated in a vacuum furnace 110 to a temperature of approximately 1,925° F. and the furnace is evacuated to a relatively high vacuum to remove substantially all the oxygen. When the coating is heated, the binder is volatized, but the nickel alloy remains in place. Before the melting temperature of the nickel alloy is reached, the vacuum is reduced by partially backfilling with an inert gas such as argon or nitrogen. When the nickel alloy melts, it flows by capillary action to integrally braze the assembly together and provide the protective nickel coating 80 on the surfaces.

Reference is now made to FIGS. 2–8 to describe the additional steps involved in providing the nozzle 10 with a nose portion 24 having the circular forward end portion 100 of the heating element 68 encircling the melt bore 38 adjacent the gate 42.

Figure 3:
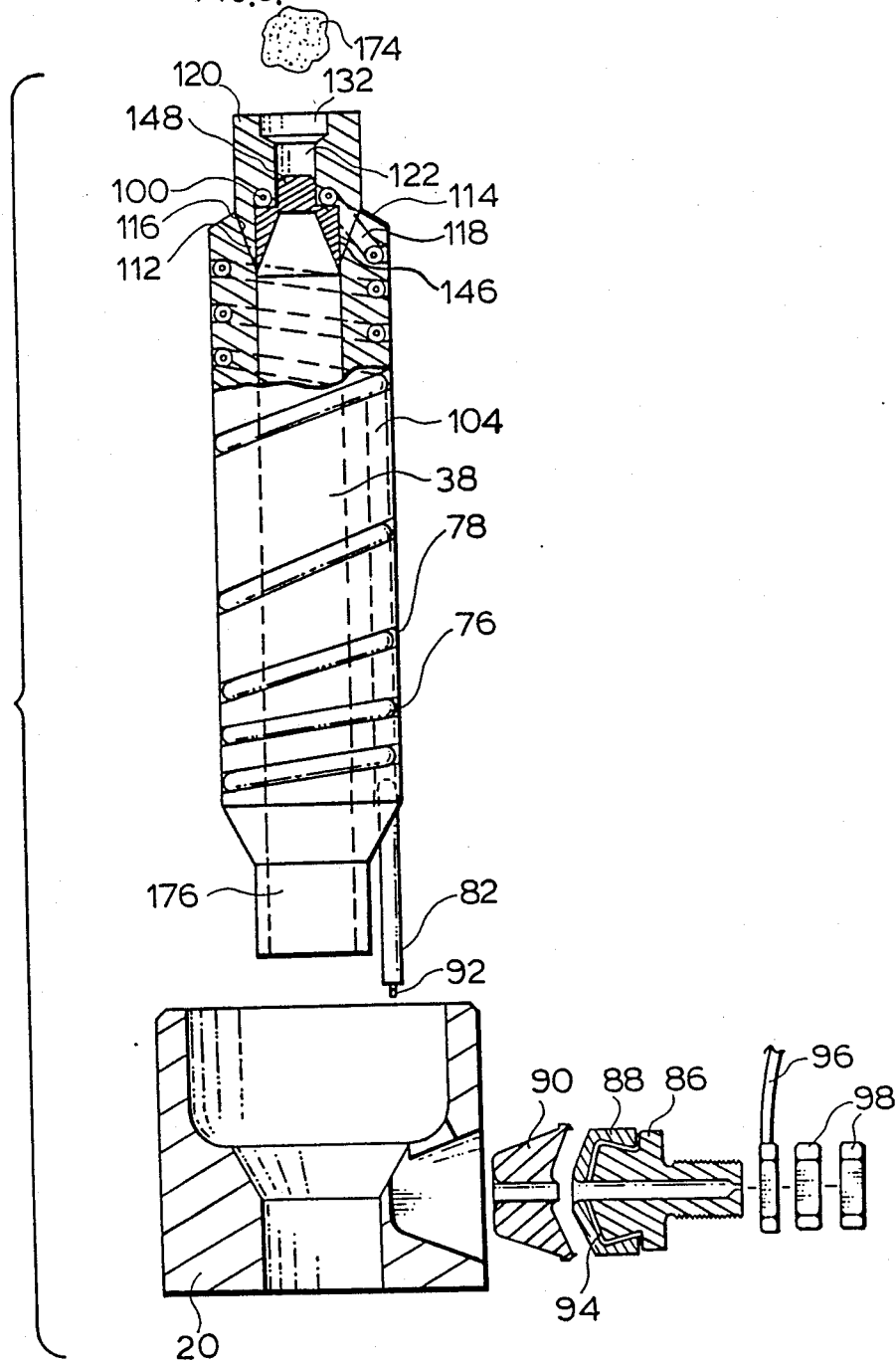

Firstly, as seen in FIG. 3, the main body portion 104 is made with an opening 112 at the forward end 114. This opening extends in alignment from the central melt bore 38 and has an inner surface 116 which tapers outwardly forward to the forward end 114. Then a heating element bore 118 is drilled diagonally to join the forward end of the spiral channel 78.

As best seen in FIG. 2, a funnel member 120 is formed of steel with a central bore 122 extending therethrough from the rear end 124 of to the forward end 126. The bore 122 has a larger diameter portion 128 extending from the rear end 124 and a smaller diameter portion 130 which extends from an enlarged mouth 132 at the forward end 126. The larger and smaller diameter portions 128,130 of the bore 122 join at a radially extending shoulder 134. In this embodiment the larger diameter portion 130 has a cylindrical inner surface 136 which is equal in diameter to the melt bore 38 and which joins the radial shoulder 134 at a bend 138 which has the same radius as the heating element 68. The funnel member 120 is also made with a rear portion 140 having a tapered outer surface 142 which extends outwardly forward from the rear end 124 and matches the tapered inner surface 116 of the opening 112 at the forward end 114 of the main body portion 104. This rear portion 136 is machined to have a slot 144 which extends diagonally to receive the heating element therethrough, as described below.

A hub member 146 is formed of steel with a smaller diameter solid head portion 148 at the forward end 150 extending from a larger diameter rear portion 152 at the rear end 154. The head portion 148 and the larger diameter rear portion 152 join at a radially extending shoulder 156. The head portion 148 has a cylindrical outer surface 158 which fits into the smaller diameter portion 130 of the funnel member 120 and which joins the radially extending shoulder 156 at a bend 160 which has the same radius as the heating element 68 (as seen in FIG. 6). In this embodiment, the rear portion 152 of the hub member has a cylindrical outer surface 162 which fits inside the inner surface 136 of the larger diameter portion 128 of the bore 122 through the funnel member 120 and is substantially equal in diameter to the melt bore 38. The rear portion 152 has a central opening 164 with an inner surface 166 which tapers inwardly forward from a mouth 168 at the rear end 154 which is substantially equal in diameter to the melt bore 38. The rear portion 152 of the hub member 146 is also made with a heating element slot 170 extending therethrough which matches the slot 144 through the funnel member 120 and the diagonal bore 118 at the forward end 114 of the main body portion 104.

The casing 74 and insulating material are stripped to expose the resistance wire 92 for a short distance from the forward end 72 of the heating element 68. A forward end portion 100 is then wound in a circle around the head portion 148 of the hub member 146, with the remainder of the heating element 68 extending off at an angle as illustrated in FIG. 2. Alternately, the forward end portion 100 of the heating element 68 can be formed in the loop shown and seated in the larger diameter portion 128 of the bore 122 through the funnel member 120. The hub member 146 is then pressed into the funnel member 120 with the forward end portion 100 of the heating element 68 extending around the circumferential space 172 formed between the radially extending shoulders 134,156 of the funnel and hub members 120,146. The funnel and hub members 120,146 are then tack welded together to hold them in this position wherein the head portion 148 of the hub member 146 is received in the matching smaller diameter portion 130 of the bore 122 through the funnel member 120 and the rear portion 152 of the hub member 146 is received in the matching larger diameter portion 128 of the bore 122 through the funnel member 120. In this position the heating element 68 extends outwardly rearward through the aligned diagonally extending heating element slots 144,170 extending through the assembled funnel and hub members 120,146.

The rear end 70 of the heating element 68 is then pulled through the heating element bore 118 which extends diagonally from the forward end 114 of the main body portion 104, and the assembled funnel and hub members 120,146 are seated in the tapered opening 112 in the forward end 114 of the main body portion 104. In this position, the tapered outer surface 142 of the rear portion of the funnel member 120 seats against the matching tapered inner surface 116 of the opening 112 in the forward end 114 of the main body portion 104. In the preferred embodiment at least one of the outer surface 142 or the matching inner surface 116 is given a roughened finish to promote capillary action during brazing, as is also the case with the other matching surfaces. The assembled funnel and hub members 120,146 are then tack welded to the main body portion 104 to hold them in this position wherein the diagonal heating element bore 118 is aligned with the aligned slots 144,170 through the funnel and hub members 120,146.

The spiral portion 76 of the heating element 68 is then wound in the spiral channel 78 and the collar portion 20 is mounted at the rear end of the main body portion 104 with the rear end portion 82 of the heating element 68 extending out through the terminal body 86, as illustrated in FIGS. 1 and 3 and described above. After the assembly is sprayed with a binder 106 such as acrylic lacquer and dipped in agitated metallic powder 108 as illustrated in FIGS. 4 and 5 and nickel brazing paste is applied to the joints, a predetermined quantity of brazing material 174 such as nickel alloy powder is loaded into the upright mouth 132 of the smaller diameter portion 130 of the bore 122 through the funnel member 120. As seen in FIG. 6, this powder 174 nearly fills the bore 122 above the head portion 148 of the hub member 146.

As shown in FIG. 7, the assembled nozzles 10 are then loaded in batches into the vacuum furnace 110 in the brazing step described above. In this embodiment, as the furnace is gradually heated to a temperature of approximately 1,925° F., the furnace is evacuated to a relatively high vacuum to remove substantially all the oxygen. When the coating is heated, the binder is volatized, but the nickel alloy remains in place. Before the melting temperature of the nickel alloy is reached, the vacuum is reduced by partially backfilling with an inert gas such as argon or nitrogen. When the nickel alloy melts, it flows by capillary action around the roughened surface of the spiral portion 76 of the heating element 68 to completely fill the spiral channel 78 and integrally embed the heating element 68. The molten nickel alloy also flows into the space around the neck portion 176 of the main body portion 104 and the brazing paste melts and flows around the plug 90 and the protective cap 88.

At the same time, the nickel alloy powder 174 in the mouth 132 melts and flows by capilliary action between the abutting roughened surfaces of the forward end 114 of the main body portion 104, the hub member 146 and the funnel member 120. The molten nickel alloy also fills the space 172 around the circular forward end portion 100 of the heating element 68, as well as the aligned diagonal heating element bore 118 and slots 144,170. Of course, this electrically grounds the exposed wire 92 adjacent the forward end 72 of the heating element 68 to the nose portion 24 of the nozzle. This step of brazing in a vacuum furnace metallurgically bonds the nickel alloy to the steel which provides for efficient heat transfer from the heating element 68, adherence of the protective coating 80, and a strong integral composite structure of the completed nozzle 10. As seen in FIG. 1, the pitch of the spiral portion 76 of the heating element varies along its length to provide more heat at the ends of the nozzle than in the middle where there is less heat loss. This profile can be precisely controlled for any particular application by varying the pattern of the spiral channel 78 which is cast in the outer surface 18 of the main body portion 104. Joining the components of the assembly together, forming the protective coating 80, grounding the forward end 72 of the heating element 68, and heat treating all in a single insertion in the vacuum furnace facilitates considerably the manufacture of the improved nozzle.

After the nozzles 10 are cooled and removed from the vacuum furnace 110, they are machined to form the nose portion 24 having a desired configuration for a particular application. In the embodiment shown in FIG. 1, the forward end 26 is concave to match the core molded cavity 34 used for preforms for stretch-blow bottles, but many other variations can be used. The gate 42 having a desired size and shape is made by machining through the head portion 148 of the hub member 146 to smoothly join the tapered inner surface 166 of the hub member 146 to form an extension of the central melt bore 38. As can be seen, nose portion 24 of the nozzle 10 has embedded circular forward end portion 100 of the heating element 68 extending around the melt bore 38 very close to the melt bore 38 and the gate 42. Not only does this provide substantial additional heat to the gate area for this type of sprue gating, it distributes the heat uniformly around the melt bore 38. This provides for more efficient molding of more difficult to mold materials and greatly improves thermal gating.

While the description of the nozzle and method of making it have been given with respect to particular embodiments, it is not to be construed in a limiting sense. Variations and modifications will occur to those skilled in the art. For instance, the nose portion 24 of the nozzle 10 can be made to receive a removable gate insert (not shown) rather than forming the gate directly as described in the preferred embodiment. Also, it is apparent that the funnel and hub members 120,146 can have various other matching shapes and that the steps according to the invention can be carried out in different sequences to provide manufacturing convenience and efficiency. Reference is made to the appended claims for a definition of the invention.

What I claim is:

1. In a sprue gated injection molding nozzle having a forward end, a rear end and a central portion, said nozzle having a generally cylindrical outer surface extending between a collar portion adjacent the rear end and a nose portion adjacent the forward end, the nose portion having a substantially smaller outer diameter than the central portion, the nozzle having a central melt bore which extends from an inlet at the rear end to a gate at the forward end, the nozzle having an electrically insulated heating element, said insulated heating element having a rear end, a forward end and a central portion integrally brazed in a spiral channel in the cylindrical outer surface of the central portion of the nozzle, the rear end of the heating element extending out through the collar portion to an electrical terminal, the improvement wherein;

the electrical heating element has a circular forward end portion adjacent the forward end of the nozzle, said circular forward end portion of the electrical heating element being integrally brazed in the smaller diameter nose portion of the nozzle to substantially encircle the central melt bore extending therethrough.

* * * * *